United States Patent [19]
Kim et al.

[11] 3,771,960
[45] Nov. 13, 1973

[54] GAS ANALYZER

[75] Inventors: Young Ho Kim, Palo Alto, Calif.;
John N. Pattison, Cincinnati, Ohio;
Kenneth W. Johnson, Palo Alto, Calif.

[73] Assignee: AMBAC Industries Incorporated, Garden City, N.Y.

[22] Filed: July 28, 1971

[21] Appl. No.: 166,784

[52] U.S. Cl. ............ 23/232 E, 23/254 E, 48/180 R, 48/DIG. 5
[51] Int. Cl. ..... B01f 3/02, G01n 27/16, G01n 23/22
[58] Field of Search ....................... 23/232 E, 254 E, 23/255 E, 232 R, 232 US, 254 R, 255 R; 73/27, 23 US; 340/237 P, 237 S; 48/DIG. 5

[56] References Cited
UNITED STATES PATENTS

| 3,399,398 | 8/1968 | Becker et al. | 23/255 E X |
| 3,237,181 | 2/1966 | Palmer | 23/254 E UX |
| 3,251,654 | 5/1966 | Palmer | 23/254 E X |
| 3,440,017 | 4/1969 | Palmer | 23/254 E |
| 3,421,362 | 1/1969 | Schaeffer | 23/255 E X |
| 3,149,921 | 9/1964 | Warner | 23/254 E X |
| 2,380,391 | 7/1945 | Bates | 48/DIG. 5 |
| 3,519,391 | 7/1970 | Winter et al. | 23/254 E X |
| 3,714,283 | 1/1973 | Rice et al. | 48/DIG. 5 X |

FOREIGN PATENTS OR APPLICATIONS

| 465,973 | 5/1937 | Great Britain | 23/232 R |

Primary Examiner—Joseph Scovronek
Attorney—Robert R. Thornton

[57] ABSTRACT

A catalytic combustion Wheatstone bridge type gas analyzer produces a mixture of gas and air by gaseous diffusion of the gas and air separately through porous walls into a reaction chamber to form the mixture, which contacts the catalytic element in the bridge circuit. The porosity of the walls is selected to permit gaseous diffusion transfer while preventing gaseous transfer into the reaction chamber by convection. The relative surface areas for diffusion of the gas sample and air are selected to provide a predetermined dilution ratio for the sample.

12 Claims, 8 Drawing Figures

PATENTED NOV 13 1973 3,771,960

FIG_1_

FIG_2_

FIG_6_

FIG_8_

AUTOMOBILE EXHAUST TAIL PIPE PRESSURE RANGE (IDLE SPEED)

PER CENT CARBON MONOXIDE CONCENTRATION

EXHAUST PRESSURE IN INCHES OF WATER

GAS ANALYZER

BACKGROUND OF THE INVENTION

1. Field of the Invention

This invention pertains to combustible gas analyzers of the wheatstone bridge type which utilize an active catalytic element and a compensating element in the bridge circuit. Combustible gas concentration is measured as a function of bridge imbalance which occurs as a result of the heating of the catalytic element upon combustion of the gaseous mixture being detected. The invention is particularly directed to the analysis of gas samples of a composition such as to require dilution with oxygen for complete combustion.

2. Description of the Prior Art

Gaseous analyzers of the Wheatstone bridge type are well known and generally rely upon a change in the impedance of an active element in the bridge circuit in response to the presence of a gas. The active element may be a simple thermal detector element, or the active element may in fact initiate combustion of the gas, as are described in U. S. Pat. No. 2,883,270. In either event, the impedance of the active element in the bridge changes in response to the presence of the gas. This change in impedance unbalances the wheatstone bridge, so as to produce an electrical output, the magnitude of which is a function of the concentration of the gas detected.

In application Ser. No. 707,814, filed Feb. 23, 1968, entitled GAS ANALYZER, now U. S. Pat. No. 3,586,486 issued June 22, 1971 there is shown a device specifically adapted for use in the detection of the concentration of carbon monoxide in automobile exhaust. That device utilizes dilution of the automobile exhaust with air in order to produce a combustible mixture, which is then passed over a catalytic element in a Wheatstone bridge circuit. That device, while providing accurate measurement of the content of carbon monoxide in exhaust gas, which is a measure of the pollution characteristic of the engine, is a comparatively bulky and expensive instrument, more adapted for laboratory or shop use than for field use. Such a characteristic is inherent in that device, since the device utilizes a vacuum pump to insure constant flow rate through a reaction chamber in which the gas combustion occurs in the presence of the catalytic element.

SUMMARY

The present invention, in its apparatus aspects, relates to an analyzer adapted for field use. According to the present invention, a gas analyzer of the Wheatstone bridge type has a hollow inlet chamber, open at one end to which a gas sample to be analyzed is applied. Separate porous wall means are utilized for the gaseous diffusion transfer of the gas sample and a second or dilutent gas, such as air, into a reaction chamber. The reaction chamber contains the active catalytic element of the Wheatstone bridge. The wall means porosity is selected so as to inhibit gaseous transfer through the walls by convection while permitting gaseous diffusion transfer therethrough. The gas sample and second gas diffused diffuse through the wall means mix together to form a combustible mixture which contacts the active catalytic element. The relative surface areas for diffusion of the gas sample and second gas are preselected to insure achievement of the completely combustible mixture, while providing a predetermined dilution ratio of the sample so that the combustible gas content of the undiluted gas sample can be determined. As used herein, the terms "second gas", "dilutent" and "dilutent gas" are used interchangeably to comprehend both a gas which may function merely to dilute the sample and a gas which also provides an oxidant, either as the only constituent of the gas or as a component of a mixture of gasses.

In the preferred embodiment, the means for passing the gas into the inlet chamber includes a first tubular probe extending outwardly from the inlet chamber and a second tubular probe, disposed within the first tubular probe. The second tubular probe opens into the inlet chamber and the first inlet probe is sealed therefrom. At least one drain aperture is formed in the first probe adjacent the inlet chamber to permit drainage of moisture which may accumulate from the gas to be analyzed. The second inlet probe functions to prevent the passage of this moisture into the inlet chamber.

In its method aspects, the invention relates to producing a completely combustible mixture of a gas sample from an incompletely combustible sample by simultaneously diffusing the sample and a second gas, such as air, through separate porous wall portions of preselected porosities, such as to permit gaseous diffusion transfer while inhibiting gaseous transfer by convection, into a reaction chamber in pre-determined proportions to produce the completely combustible mixture by preselecting the relative surface areas of the porous wall portions through which the sample and second gas diffuse.

BRIEF DESCRIPTION OF THE DRAWING

The invention may be more clearly understood by referring to the accompanying drawing, in which:

FIG. 3 is a schemactic diagram illustrating an embodiment of the Wheatstone bridge circuitry utilizable with the present invention;

DESCRIPTION OF THE PREFERRED EMBODIMENT

Figure 1:
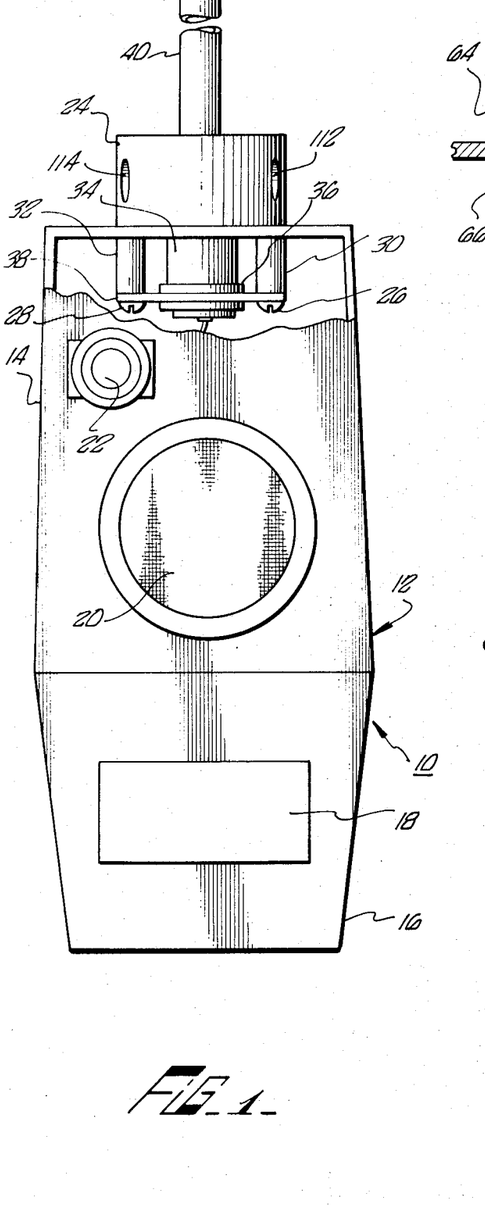
FIG. 1 is a view, partially broken away, of a gas analyzer according to the present invention.

Referring now to FIG. 1, a gas analyzer 10 has an analyzer body shown generally at 12 as consisting of an analyzer portion 14 and an aural portion 16. The aural portion 16 has a speaker 18 which may be used to generate an aural warning indication when the combustible gas mixture reaches a preselected concentration. As such, in the preferred embodiment, the aural portion 16 is detachable from the analyzer portion 14 and forms no part of the present invention. A device embodying an aural warning of gas concentration is shown, for example, in U. S. Pat. No. 3,438,738, issued Apr. 15, 1969.

The analyzer body portion 14 includes a meter 20 which reads in percent gas concentration. If desired, the analyzer body portion 14 may include means 22 to adjust the zero meter reading although such structure does not form a part of the present invention. An inlet chamber 24 is attached to the analyzer body 14 by means of a pair of bolts 26, 28, which extend through standoff pins 30, 32 and the analyzer body 14 through appropriate passages therein. As is seen in FIG. 1, a reaction chamber 34 has a peripheral base flange 36. The base flange 36 is attached to a mounting plate 38 by means of a pair bolts (not shown). The mounting plate 38, as is seen in FIG. 1, is held in place by means of the bolts 26, 28.

Extending from the inlet chamber 24 is a gas probe 40. In the preferred embodiment, the gas probe is approximately 16 inches in length, while the length of the analyzer body portion 14 is about 4 inches. Consequently, for purposes of illustration, the probe is shown as broken.

Figure 2:
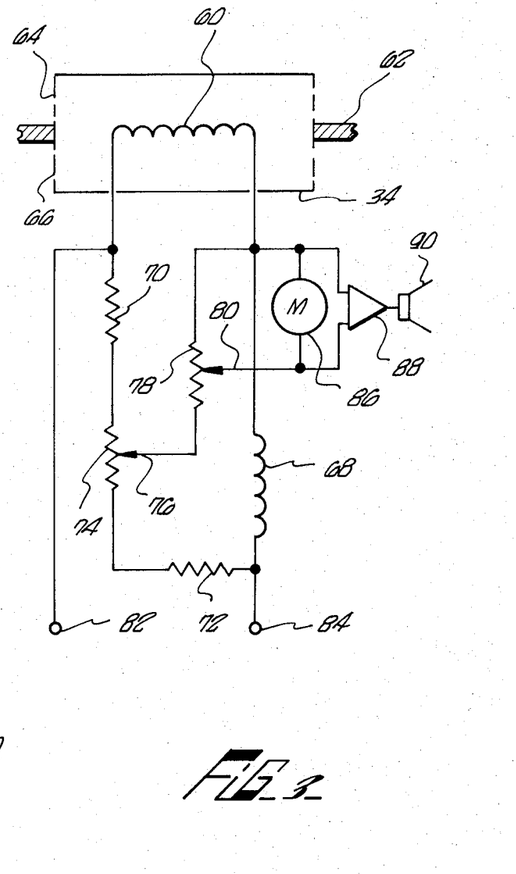
FIG. 2 is a block diagram of the gas analyzer of the invention illustrating gas flow.

Referring now to FIG. 2, there is shown, in block diagram form, the flow paths of the gas being analyzed and dilutent air in the present invention. The gas sample enters the probe 40, shown as having an aperture 42 to permit the drainage of moisture therefrom. The probe 40 is seen to include an inner probe 44, through which the sample passes into the inlet chamber 24. From the inlet chamber, the sample passes into the reacton chamber 34. A dilutent air source 46, which in the embodiment of FIG. 1 is air contained within the analyzer body 14, also passes into the reaction chamber. A Wheatstone bridge 48, of the catalytic combustion type, measures gas concentration as a function of bridge imbalance, and this imbalance is detected by an indicator 50 which may be, for example, a meter, an aural alarm, or any other desired indication, control, or alarm circuitry.

In FIG. 3, an embodiment of Wheatstone bridge circuitry which may be utilized in the practice of the present invention is shown. An active catalytic element 60, which may be, for example, the active element of the aforesaid application Ser. No. 707,814, is contained within the reaction chamber 34. The reaction chamber also has porous walls, and a peripheral seal 62 divides the porous walls into a gas sample portion 64 and a dilutent air portion 66. The Wheatstone bridge circuitry of FIG. 3 includes a compensating resistance element 68 and is completed by a pair of matched resistors 70, 72 which are connected by a zero adjust potentiometer 74. The zero adjust potentiometer 74 has an arm 76 which is connected to one end of a calibration potentiometer 78, which is connected across the bridge. The calibration potentiometer 78 has an arm 80 which provides one side of the bridge output. The Wheatstone bridge circuitry of FIG. 3 functions in the familiar manner, having its actuating potential applied across a pair of input terminals 82, 84. Thus, it will be apparent, that by adjustment of the calibration potentiometer, the magnitude of the potential which is applied across a meter 86 and to an amplifier 88 is adjustable. The output of the amplifier 88 is applied to a speaker 90 to provide an aural indication, either by intensity, or by actuation, at a preselected potential or current flow rate, to give an indication of gas concentration.

Figure 4:
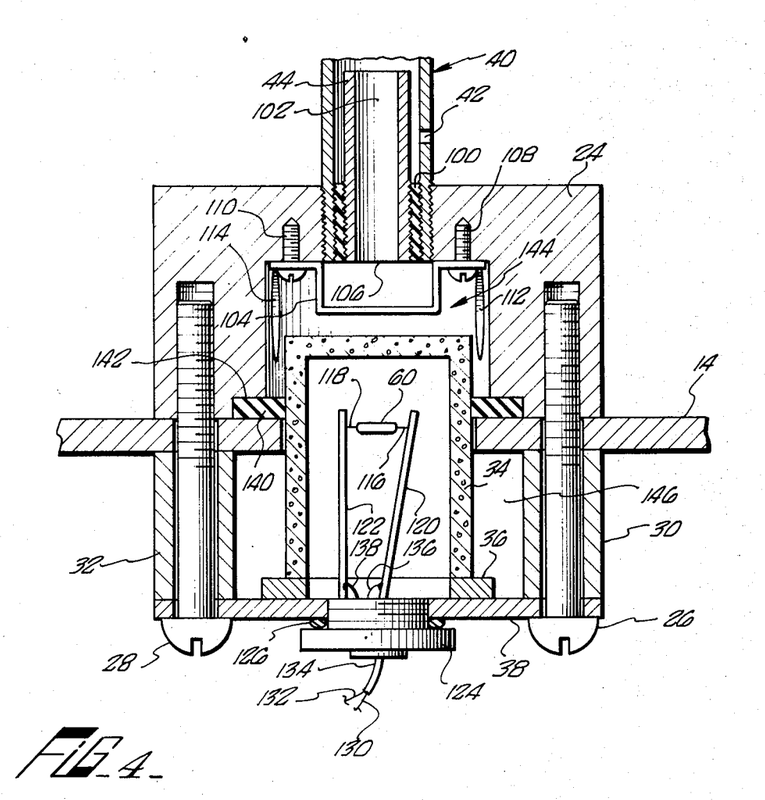
FIG. 4 is a sectional view of a portion of FIG. 1, illustrating the structure of the invention.

Referring now to FIG. 4, there is shown in cross section the reaction chamber portion of the gas analyzer of the present invention. The probe 40, with the drain hole 42, is shown as threadably engaging the inlet chamber 24. Within the probe 40, at the inlet chamber, there is a threaded sleeve 100, which threadably engages both the inner surface of the probe 40 and the outer surface of the inner probe 44. As will be apparent from FIG. 4, the inner probe 44 shields the drain hole 42 from the hollow interior of the inlet chamber 24. In a practical embodiment of the device, shown in FIG. 4, the drain hole 42 is located about one inch from the inlet chamber 24 and the inner probe 44 extends about one inch beyond the drain hole 42. The inner probe 44 has a hollow central passage 102 extending therethrough, so as to provide communication between the probe 40 and the hollow interior of the inlet chamber 24. A baffle plate 104 is disposed within the hollow interior of the inlet chamber adjacent an aperture 106 formed in the inlet chamber. As will be seen in FIG. 4, the probe 40, including the sleeve 100 and inner probe 44, are disposed within this aperture 106, reducing its effective diameter to that of the passage 102. The baffleplate 104 is attached to the inlet chamber 24 by means of a pair of bolts 108, 110 which extend through apertures formed in the flanged portion of the baffleplate. Also shown in FIG. 4 are a pair of exhaust passages 112, 114 which extend through the inlet chamber to its outer surface, so as to provide venting of the chamber to the atmosphere.

The reaction chamber 34 is seen in FIG. 4 to be hollow so as to have a reaction space contained therewithin, within which the gas to be analyzed and the dilutent gas mix. The active catalytic element 60 is contained in the reaction space by means of a pair of electrical leads 116, 118 which support the catalytic element 60 between a pair of electrically conductive mounting posts 120, 122. The electrically conductive mounting posts 120, 122 extend into an insulating support base 124, which threadably engages the mounting plate 38. An O-ring 126 forms a seal between the support base 124 and the mounting plate 138. A pair of electrical leads 130, 132, insulated one from the other, are contained in an electrical conductor 134 and extend through the base 124. The leads 130, 132, are electrically connected, for example by spot welds 136, 138, to the mounting posts 120, 122.

The hollow interior of the inlet chamber is divided into two separate sections by means of a sealing gasket 140, which is fitted between the analyzer body 14 and a shoulder 142 formed on the interior of the inlet chamber 24. The sealing gasket 140, which may be made of any appropriate substance, forms a peripheral seal about the reaction chamber 34, so as to seal a first portion 144 of the hollow interior of the inlet chamber 24, adjacent the inlet aperture 106, from communication with a second portion 146 of the hollow interior of the inlet chamber 24 adjacent the mounting plate 38. Thus, the only means of communication between the first inlet chamber portion 144 and the second inlet chamber portion 146 is through the porous walls and interior of the reaction chamber 34. The reaction chamber 34 has porous side walls. For example the reaction chamber may be composed of sintered bronze spheres of approximately 15 microns diameter, compressed to provide a porosity of 50 percent void, the wall being of a thickness of 0.08 inches.

The porosity of the walls of the reaction chamber 34 is selected, with respect to the gas to be analyzed and air, to permit diffusion transfer of the gas and air through the walls while preventing, or at least significantly inhibiting, mass transfer of the gas or air through the walls. The baffleplate 104 serves to further inhibit mass transfer of the gas to be analyzed through the porous walls, which might otherwise occur if the gas to be analyzed were permitted to impinge directly upon the porous walls at a significant velocity. In practice, the baffleplate serves to reduce the velocity of the gas being analyzed, at the time it contacts the porous walls, to substantially zero. Further, the exhaust apertures 112, 114 insure that no significant pressure differential will exist within the first inlet chamber portion 144 adjacent the porous walls of the reaction chamber.

As has been mentioned heretofore, certain types of gas to be analyzed, for example automobile exhaust, do not provide a combustible mixture without dilution with additional oxygen. Additional oxidant is most easily provided by using air as a dilutent. It has been found that the ratio of carbon monoxide to other combustibles in exhaust gasses is fairly constant, constituting approximately 75 percent of the total combustibles. Therefore, while devices embodying the invention may be calibrated to read percent carbon monoxide, in reality the devices are measuring the total combustible content and utilizing a fixed ratio of carbon monoxide to total combustibles to determine the carbon monoxide content.

In order to have the bridge imbalance, resultant from catalytic action of the active element, provide a meaningful indication of gas concentration, it is necessary to maintain a constant proportion of the dilutent and the gas to be analyzed. It is the function of the porous reaction chamber walls to provide this constant proportion. By inhibiting mass transfer through the reaction chamber walls, particularly of the gas to be analyzed by avoiding direct impingement of the gas on the reaction chamber walls, diffusion transfer of the gas and the dilutent through the walls take place at substantially constant rates. The ratio of dilutent to gas is determined by the comparative surface areas of the porous walls available for gaseous diffusion. It is important that the active element 60 not be located in an extreme portion of the reaction chamber, in order to avoid detecting either an excess of either gas to be analyzed or dilutent air. Although the physical location of the active element 60 within the reaction chamber 34 is a factor in determining the bridge imbalance, since the element 60 is fixed in location, once the device has been calibrated in this regard, no further adjustment is necessary.

In operation, the device functions in the manner of a conventional Wheatstone bridge gas detector of the catalytic element type. The device is adjusted for proper zero setting by means of movement of the potentiometer arm 76. When the device is zeroed, calibration, if necessary, is accomplished by application of a sample of known combustible content to the probe 40 and adjustment of the potentiometer arm 80 to provide proper indication on the meter 86. The gas to be analyzed, or the calibration sample, passes into the interior passage 102 formed within the inner probe 44 and through the aperture 106, whereupon it is deflected by the baffle 104, if under any significant pressure differential with respect to the atmosphere. The sample then spreads throughout the sample chamber portion 144, diffusing through the porous walls of the reaction chamber 34 and passing through the exhaust passages 112, 114. As will be apparent, the embodiment shown in FIG. 4 is primarily designed to monitor a continuous sample source, for example, a source which provides a sample for 30 seconds or more. Diluent air enters the analyzer body 14 through appropriate holes or apertures (not shown), diffuses through the porous walls 34 from the second inlet chamber portion 146, and mixes with the portion of the sample which has diffused through the reaction chamber walls to provide the mixture to be analyzed. The catalytic element temperature changes in response to the combustion of the mixture, therein unbalancing the Wheatstone bridge and rendering the appropriate reading on the meter 86. The device, in this embodiment, has a response time of about five seconds.

Figure 5:
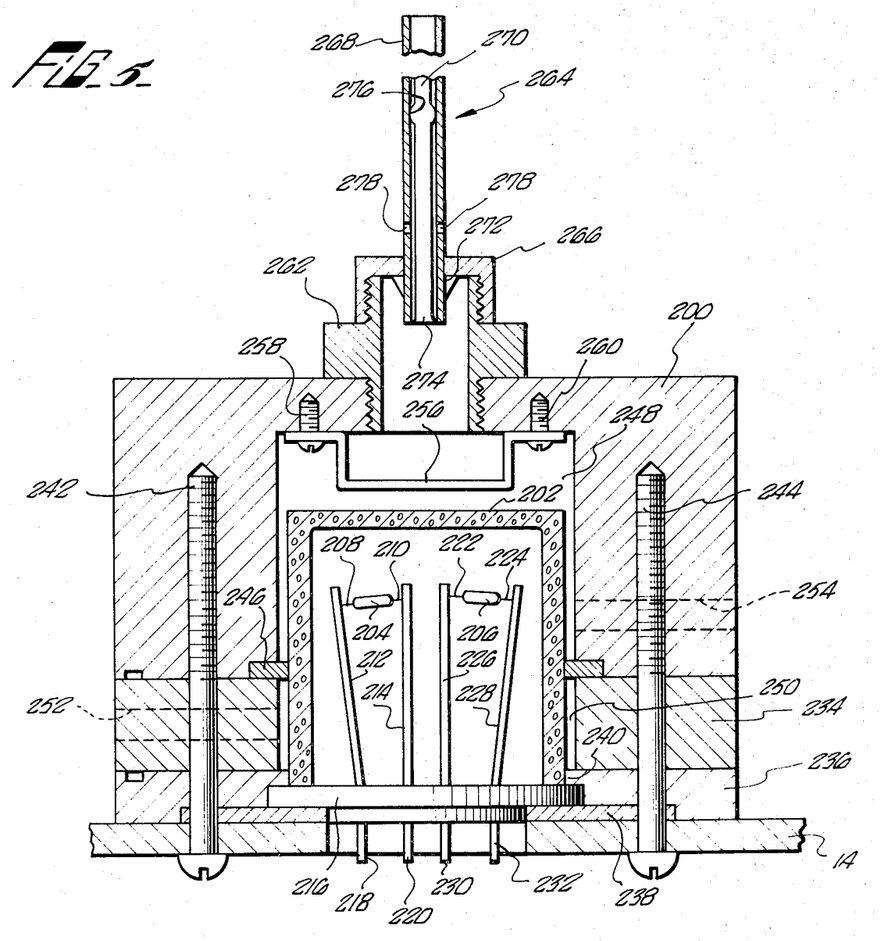
FIG. 5 is a view, in section, of an alternate embodiment of the invention corresponding generally to FIG. 4.

FIG. 5 is a view, in section, of an alternate embodiment of the invention. The principal concept difference between the embodiment of FIG. 5 and that of FIG. 4 is that, in FIG. 5, both the catalytic element and the compensating element are disposed within the reaction chamber 202. Within the reaction chamber 202 are a catalytic element 204 and a compensating element 206, which may again be of the type shown in the aforesaid Kim et al. patent. The catalytic element 204 is mounted by means of a pair of electrical leads 208, 210 to a pair of conductive mounting posts 212, 214. The mounting posts 212, 214 extend through a nonconductive base plate 216 and terminate in a pair of terminals 218, 220. The compensating element 206 is similarly held in position by means of electrical leads 222, 224 and conductive posts 226, 228, which terminate in terminals 230, 232, respectively. The terminals 218, 220, 230, 232 provide electrical connections for connecting the elements 204, 206 in the Wheatstone bridge circuit. As will be apparent, the Wheatstone bridge circuitry of the embodiment in FIG. 5 differs from the embodiment shown in FIG. 3 in that both catalytic and compensating elements are disposed within the reaction chamber. The remainder of the circuitry for the embodiment of FIG. 5 may be the same as that of FIG. 3.

Disposed between the inlet chamber 200 and the analyzer body 14 are a retainer plate 234, a detector retainer 236, and a detector gasket 238. The component consisting of the reaction chamber 202, the nonconductive base plate 216, the resistance element 204, 206 and their associated elements, comprise the component hereinafter referred to as the detector. As will be apparent from FIG. 5, the detector is fixed in position by means of the detector retainer, which has an inner peripheral flange 240 which engages the nonconductive base plate 216 around its periphery. The detector gasket 238 forms a seal between the nonconductive base plate 216 and the analyzer body 14. Mounting bolts 242, 244 extend through the analyzer body 14, detector gasket 238, detector retainer 236, and retainer plate 234, through apertures formed therein, and threadably engage the inlet chamber 200 through appropriate threaded apertures formed therein, thus holding the entire assembly together. The inlet chamber 200, at the inner portion of its junction with the retainer plate 234, has a recess formed therein, within which is disposed a reaction chamber gasket 246. The reaction chamber gasket 246 performs the same function as the sealing gasket 140 referred to heretofore with respect to FIG. 4.

Thus, the reaction chamber gasket 246 forms a seal about the reaction chamber 202, so as to divide the hollow space within the inlet chamber 200 into a first inlet chamber portion 248 and a second inlet chamber portion 250. The retainer plate 234 has an air inlet passage 252, shown in dotted lines in FIG. 5, extending therethrough so as to provide communication between the atmosphere surrounding the device and the second inlet chamber portion 250. The air inlet passage 252 has a diameter selected to be low enough to insure that the oxygen diffusion rate of the catalytic element does not limit the catalytic reaction rate; in other words, that there is an excess of oxygen of the catalyst surface. On the opposite side of the device from the air inlet passage 252, the inlet chamber 200 has an exhaust passage 254.

The inlet chamber 200 has a gas inlet aperture formed at the closed end thereof, beneath which a baffleplate 256 is disposed and attached by means of a pair of bolts 258, 260. The gas inlet aperture is threaded, and a gas inlet connector 262 is connected thereto, so as to cover the gas inlet aperture. Connected to the gas inlet connector, at a threaded end thereof opposite the gas inlet aperture, is a probe assembly 264. The probe assembly consists of a locking nut 266 which engages the gas inlet connector 262, an outer probe tube 268, an inner probe tube 270, and a seal 272. The probe assembly 264 differs from the probe assembly of FIG. 4 principally in the means by which the inner probe is fixed with respect to the outer probe. In the probe assembly 264, the inner probe 270 is seen to have a flared end 274 which opens into the hollow interior of the gas inlet connector 262. The flared end 274 is of a greater diameter than of the inner diameter of the outer probe 268, and so forms a seal of the outer probe with respect to passage of gas or moisture from the outer probe directly into the gas inlet connector. The inner probe 270 is held in position within the outer probe 268 by means of being crimped at 276 so as to be locked within the outer probe. The outer probe 268 has moisture outlets 278 which permits any moisture which may be condensed within the outer probe to pass therethrough. Obviously, the crimped portion 276 is not a completely peripheral crimp, in order to avoid sealing the outer probe 268 from the moisture outlets 278.

Typical dimensions for the probe assembly 264 are as follows:

Outer probe 268, 18 inches long, ⅜ inch outer diamater tubing;
inner probe 270, 6 inches long, ¼ inch outer diameter tubing;
moisture outlets 278, 1 inch from flare 274.

Figure 6:
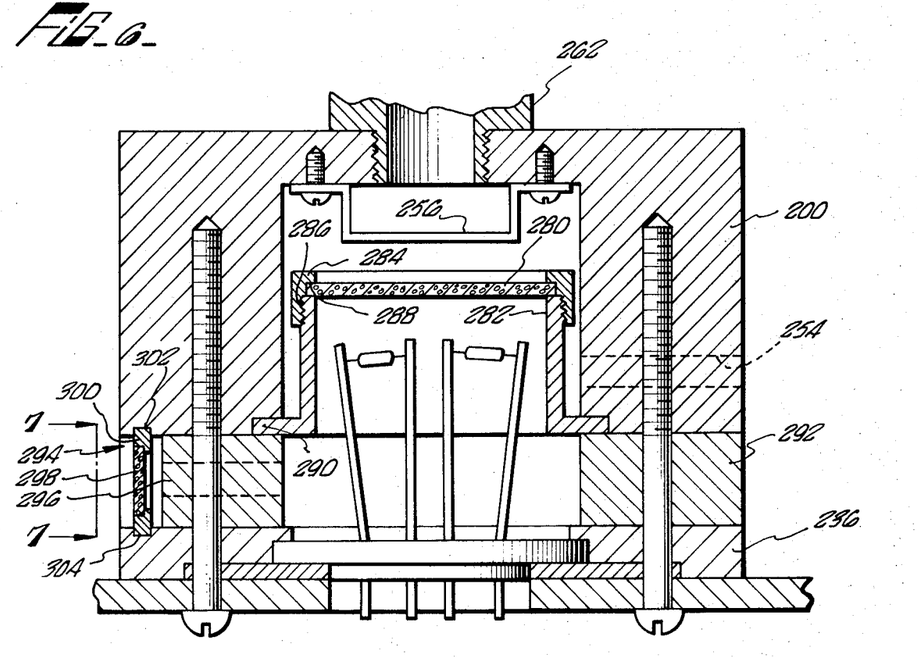
FIG. 6 is a view, in section, of another alternate embodiment of the invention corresponding generally to FIG. 4.

FIG. 6 illustrates another embodiment of the present invention, generally similar in structure to FIG. 5. However, the embodiment of FIG. 6 differs from that of FIG. 5 in various respects, principally in the structure of the reaction chamber and porous walls. In FIG. 6, components which are the same as the components of FIG. 5 are given identical numbers.

In FIG. 6, a porous wall or barrier 280 is disposed directly beneath the baffleplate 256 by being mounted on a seal and support member 282, which functions as a combined stand and seal. The porous barrier 280 is attached to the sealing member 282 by a sealing ring 284, which may be of any appropriate structure and material. As shown in FIG. 6, the sealing ring 284 engages a threaded portion 286 on the sealing member 282 and has a lip 288 which overlays the edge of the porous barrier 280. The sealing member 282 has a peripheral flange 290 which forms a seal between the inlet chamber 200 and a retainer plate 292.

The retainer plate 292 is generally of the same construction as the retainer plate 234 of FIG. 5. However, at the side of the retainer plate 292 opposite the exhaust passage 254 in the inlet chamber 200, a recess 294 is formed. A dilutent passage 296, corresponding to the dilutent passage 252 of FIG. 5, opens into the recess 294. Disposed in the recess 294, so as to seal the passage 296 from direct communication with the exterior of the device, is a second porous wall or barrier 298. The second porous wall or barrier 298 is contained within a mounting plate 300. The mounting plate 300 forms a seal with the inlet chamber 200 by means of a recess 302 within which the mounting plate fits. A similar recess 304 in the detector retainer 236 forms a second seal with the mounting plate. Seals at the ends of the mounting plate are similarly formed by recesses in the retainer plate 292, as will be seen more clearly in FIG. 7. Obviously, any other appropriate means for forming a seal with the porous barrier 298 may be used.

In the embodiment of FIG. 6, the reaction space, that is, that space into which the gas and dilutent diffuse, mix and contact the catalytic element, is seen to be bounded by the porous barrier 280, the sealing means 282, the retainer plate 292 and to extend through the dilutent passage 296 to the second porous barrier 298. Obviously, the second porous barrier 298 could be mounted immediately adjacent the peripheral flange 290, if desired, so as to have the porous barrier protected by the retainer plate 292. In such an embodiment, the inlet passage 298 would open directly into the atmosphere and terminate at the porous barrier 298, as does the inlet passage 252 in FIG. 5.

Figure 7:
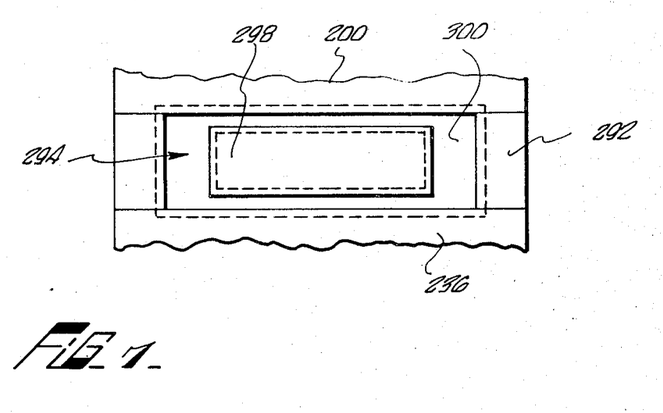
FIG. 7 is a. view of a portion of the embodiment of FIG. 6, taken generally along lines 7—7 of FIG. 6.

FIG. 7, is a view taken generally along lines 7—7 of FIG. 6, but not in section, so as to show the side elevation of the second porous barrier 298 and mounting plate 300 in their mounted position. Dotted lines are utilized to show the inner and outer extremities of the mounting plate 300. It will be apparent, from FIG. 7, that the surface area of the second porous barrier 298 may be changed, as desired, by inserting other mounting plates 300 holding porous barriers 298 having different surface areas in the device. By such a substitution, the relative proportion of air or other dilutent diffusing into the reaction chamber, with respect to the gas diffusing into the reaction chamber, can be preselected. Similarly, the surface area of the porous means 280 may be changed, either by utilizing a mounting plate similar in concept to that of the mounting plate 300 in conjunction with the sealing means 282 to decrease the surface area, or by making the sealing means 282, in large part, or in total, of the same material as the porous barrier 280, so as to provide greater surface area.

The operation of the apparatus of the present invention will now be described. Inasmuch as each of the embodiments operates in the same manner, the following description will apply to all embodiments. The embodiments are directed particularly to the analysis of automobile exhaust at engine idle speeds. It has been found that, at engine idle speed, the pressure in the exhaust pipe of the automobile ranges from 0.1 to 0.55 inches of water. The variation is a result of the variation in engine types, engines of less power having less exhaust pressure as a general rule. It has been found that, as a general rule, carbon monoxide and hydrogen are present in automobile exhausts in an approximate ratio of 2.5 to 1. Consequently, since the particular catalytic element shown in the embodiments of the present invention is of the catalytic type, and so will cause combustion of both carbon monoxide and hydrogen, it is necessary to take into account the combustion of hydrogen in order to determine the carbon monoxide content. In other words, the meter must be calibrated either to read percent of total combustibles or percent of carbon monoxide. Calibration for percent carbon monoxide can be accomplished by initially calibrating the instrument utilizing a mixture of 2.5 percent carbon monoxide and 1 percent hydrogen in nitrogen, noting the meter reading, and adjusting the meter reading to read 2.5 percent carbon monoxide. Thereafter, the meter will read with suitable accuracy for carbon monoxide despite the presence of hydrogen in the exhaust gasses measured.

Figure 8:
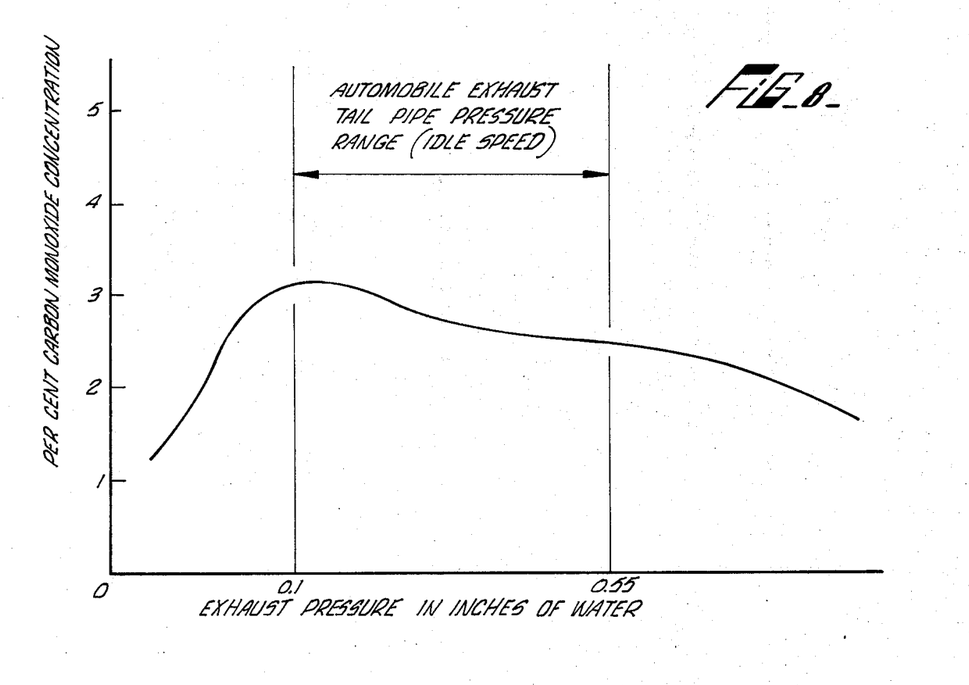
FIG. 8 is a graphical representation of the analysis characteristics of an analyzer constructed according to the present invention.

With the particular dimensions of the probe shown in the embodiments, it has been found that a variation in flow rate of sample through the probe of from four to eleven cubic feet per hour corresponds to the pressure range of 0.1 to 0.55 inches of water, the normal pressure range over which exhaust gas is applied to the probe. In FIG. 8, there is shown a response curve of the present invention with flow rate, which may also be exhaust gas pressure, as the abscissa and meter reading in percent carbon monoxide as the ordinate, the meter reading having been corrected for the presence of hydrogen as mentioned heretofore. It will be seen, over the normal operating range for tail pipe exhaust pressures for cars at idle speed, the response of the apparatus of the present invention is substantially constant, so as to be roughly independent of the flow rate or pressure over this operating range. For a sample having 2.5 percent carbon monoxide and 1 percent hydrogen, a meter reading of 2.75 carbon monoxide is accurate within twenty percent over the normal range of tail pipe pressures of engine idle. Thus, the meter reading of 2.75 would give, within the accuracy required for field work, the carbon monoxide content of any automobile exhaust at normal engine idle speed.

In operation, the probe is inserted in the automobile tail pipe with the engine operating at idle. Automobile exhaust passes through the outer probe into the inner probe and from the inner probe into the inlet chamber. If the exhaust has significant velocity, it strikes the baffleplate, causing the exhaust flow to be deflected to avoid direct impingement upon the porous barrier through which the exhaust gas is to be diffused, so as to provide a substantially zero velocity of exhaust gas adjacent the porous barrier. The exhaust gas, in part, diffuses through the porous barrier into the reaction space, and that portion not so diffused passes through the exhaust ports into the atmosphere.

The dilutent, such as air diffuses through a second porous barrier into the reaction space and mixes with the sample so diffused. Particularly when used in automobile exhaust analyzers, due to the large amount of noncombustible material in the exhaust, a relatively large proportion of dilutent air is required to be diffused into the reaction space in order to insure an excess of oxygen of the catalytic element surface, so that the rate of oxygen diffusion will not limit the catalytic reaction rate.

The amount of dilutent required can readily be predetermined mathematically, and the ratio of the surface area of the porous barrier through which the dilutent diffuses with respect to the surface area of the porous barrier through which the gas sample diffuses, required to insure sufficient oxygen, can thereby be determined. Having determined these ratios, all surface area ratios are preselected, either by fixing the physical location of the seal which separates the two portions of a unitary reaction chamber porous barrier, such as in FIGS. 4 and 5, or the surface areas of separate porous barriers, such as those of the embodiments of FIG. 6, are preselected and appropriate barriers installed in the device.

In either event, the relative proportions of the gas sample and the dilutent which diffuse into the reaction space are predetermined by the ratio of the surface areas. The gas and dilutent are then applied to their respective porous barriers and diffused through the barriers into the reaction space, where they mix and contact the catalytic element. Combustion occurs at the catalytic element, providing a rise in catalytic element temperature, which unbalances the Wheatstone bridge and gives a resultant meter reading indicative of the percent combustible content of the gas sample.

The embodiment of FIG. 6 differs from that of FIGS. 1 through 4 and FIG. 5 in the specific structure by which the relative proportions of gas and dilutent which diffuse into the reaction space are predetermined. These proportions are predetermined by preselecting the relative porous barrier areas for diffusion of the gas and the dilutent. In the embodiment of FIG. 5, these areas are most readily preselected by varying the thickness of the retainer plate 234, so as to raise or lower the seal 246, which determines the surface areas available for diffusion of both the gas and the dilutent. Obviously, in the embodiment of FIG. 5, unless the physical dimensions of the reaction chamber 202 are changed, the total surface area available for diffusion and dilutent remains constant, whereas in FIG. 6 the total area may be changed as desired. In the embodiment of FIG. 4, the relative proportions of gas and dilutent diffusing are controlled by the positioning of the seal 240 relative to the reaction chamber 34. This position may be changed by varying the length of the standoff pins 30, 32, so as to raise or lower the reaction chamber 34 within the first inlet chamber portion 144.

From the foregoing, it will be apparent that the present invention, in its method aspects, in the broadest sense utilizes the steps, in mixing a plurality of gasses, of providing a porous barrier for each gas, each of the porous barriers being preselected as to porosity so as to permit diffusion transfer but not substantial transfer by convection of the respective gas through it and preselected as to surface area as a function of the proportion in the final mixture of the gas to be diffused through it, passing each gas through its respective porous barrier by diffusion, and mixing the resulting diffused gasses.

More particularly as applied to combustible gas analyzers, the method is directed toward producing a combustible mixture of a gas sample and dilutent, such as air, and utilizes the steps of applying the gas sample to a porous barrier preselected with respect to porosity to permit diffusion transfer of the gas therethrough while inhibiting transfer therethrough by convection and preselected with respect to surface area as a function of the relative proportion of gas from the sample to be contained in the mixture resulting at the analytical element, applying the dilutent, such as air, to a second porous barrier preselected with respect to porosity to permit diffusion transfer of the dilutent therethrough while inhibiting transfer therethrough by convection and preselected with regard to surface area as a function of the relative proportion of dilutent required to at the analytical element, diffusing the gas from the gas sample and the dilutent through their respective porous barriers, and mixing the gas and dilutent which have been diffused through the porous barriers.

From the foregoing description of the method aspects of the invention, it will be apparent that it is an important element of the invention that there be no significant convection transfer through the porous barrier of the gasses. This is accomplished by insuring that the sample and dilutent do not impinge directly upon the porous barriers with significant velocity and, or in the alternative, selecting the porosity and thickness of the porous barrier so as to prevent significant net mass transfer through it. For the particular utilization described, that of exhaust gas analysis, it has been found that a fifty percent void in the porous barrier using sintered bronze spheres of 15 microns diameter, and a porous barrier thickness of about 0.08 inches avoids convection transfer in conjunction with the utilization of the baffleplate. Obviously, for different gases, and different velocities of gas, greater or lesser thicknesses, and a different percentage of void in the porous barrier, may be required in order to prevent significant convection transfer through the barriers. However, such is readily determined with respect to the individual application, for practice of the present invention.

We claim:
1. In a gas analyzer, the combination of:
a Wheatstone bridge type detector having an active element;
porous wall means having
  a first portion in communication with
  a source of a gas to be analyzed and defining a portion of a reaction space within which the active element is disposed, and
  a second portion in communication with
  a source of a second gas and with the reaction space;
means for flowing the gas to be analyzed over the first portion of the porous wall means so that only part of said gas diffuses therethrough into the reaction space;
means for sealing the first portion of the porous wall means from the second portion of the porous wall means so as to prevent the gas to be analyzed from contacting the second porous wall means portion prior to diffusion through the first portion and to prevent the second gas from contacting the first porous wall means portion prior to diffusion through the second portion, and in which the porous wall means portions have porosities which inhibit the transfer therethrough by convection of the gasses while permitting diffusion transfer therethrough of the respective gasses.

2. The combination of claim 1 and including means for applying the gas to be analyzed to the porous wall forming means first portion at a velocity such that the pressure differential across the porous wall forming means is insufficient to initiate substantial gaseous transfer therethrough by convection.

3. The combination of claim 1 and including means for applying the gas to be analyzed to the porous wall forming means first portion at substantially the same pressure as exists within the reaction chamber.

4. The combination of claim 1 and in which the two wall forming means portions comprise a unitary structure which is divided into the first and the second portions by said sealing means.

5. In a gas analyzer of the Wheatstone bridge type, the combination of:
an analyzer body;
a hollow inlet chamber having a gas inlet at one end, and exhaust means remote therefrom;
means attaching the inlet chamber to the body;
a reaction chamber;
porous wall forming means on said reaction chamber, said wall forming means having a porosity such as to inhibit gaseous transfer therethrough by convection while permitting gaseous diffusion transfer therethrough;
an active element mounted within said reaction chamber;
means forming a peripheral seal about said reaction chamber so that a first portion of the reaction chamber has porous walls in communication with the inlet chamber gas inlet and sealed from a second portion of the reaction chamber;
means for flowing a gas to be analyzed through the gas inlet so that the gas pressure differential across the first porous wall portion is insufficient to initiate transfer of the gas therethrough by convection; and
communication means for communicating a second gas into said reaction chamber through said second portion.

6. The combination of claim 5 and including
an aperture in the analyzer body, the analyzer body having a hollow interior into which the aperture opens;
an open end in the hollow inlet chamber, the inlet chamber being attached to the analyzer body so that the hollow open end closes the analyzer body aperture;
means for attaching the reaction chamber to the analyzer body so that the second portion of the reaction chamber is in communication with the interior of the analyzer body by means of the aperture; and
reaction chamber second portion porous wall means included in said communication means and disposed between the interior of the reaction chamber and the analyzer body.

7. The combination of claim 6, and in which the means for applying gas through the inlet chamber includes baffle means within said inlet chamber operable to shield the reaction chamber porous walls from a direct flow of gas passing through the inlet chamber gas inlet.

8. The combination of claim 7 and including a gas probe attached to the inlet chamber, said gas probe having
a first tubular probe, of a first diameter and first length, extending outwardly from the inlet chamber;
a second tubular probe of a second diameter and second length, said second diameter and second length being less than the first diameter and first length, respectively;

means for disposing the second probe within the first probe so as to provide a gas passage from the first probe through the second probe to the inlet chamber gas inlet, said second probe shielding said inlet chamber gas inlet from direct communication with the first probe adjacent the inlet chamber; and at least one drain aperture in the first probe within the portion thereof which is coincident in length with the second probe.

9. The combination of claim 5 and including means for connecting the reaction chamber to the analyzer body so that the reaction chamber is contained within the inlet chamber; and reaction chamber second portion porous wall means included in said communication means, said communication means extending between the interior of the reaction chamber and the exterior of the analyzer through the analyzer body.

10. The combination of claim 9, and in which the means for applying gas through the inlet chamber includes baffle means within said inlet chamber operable to shield the reaction chamber porous walls from direct flow of gas passing through the inlet chamber gas inlet.

11. The combination of claim 10 and including a gas probe attached to the inlet chamber, said gas probe having a first tubular probe, of a first diameter and first length, extending outwardly from the inlet chamber;

a second tubular probe of a second diameter and second length, said second diameter and second length being less than the first diameter and first length, respectively;

means for disposing the second probe within the first probe so as to provide a gas passage from the first probe through the second probe to the inlet chamber gas inlet, said second probe shielding said inlet chamber gas inlet from direct communication with the first probe adjacent the inlet chamber; and at least one drain aperture in the first probe within the portion thereof which is coincident in length with the second probe.

12. The method of analyzing a gas sample by combustion at a catalytic element connected to analyzing means comprising, applying the gas sample to a porous barrier preselected with respect to porosity to permit diffusion transfer of the gas therethrough while inhibiting transfer therethrough by convection and preselected with respect to surface area as a function of the relative proportion of gas from the sample to be contained in the mixture, applying air to a second porous barrier preselected with respect to porosity to permit diffusion transfer of air therethrough while inhibiting transfer therethrough by convection and preselected with regard to surface area as a function of the relative proportion of air required to insure the resultant reaction rate at the catalytic element is not limited by the rate of diffusion of oxygen in the air to the catalytic element, and contacting the catalytic element with a mixture of gas and air which have diffused through the porous barriers.

* * * * *

UNITED STATES PATENT OFFICE
CERTIFICATE OF CORRECTION

Patent No. 3,771,960                Dated November 13, 1973

Inventor(s) YOUNG HO KIM, JOHN N. PATTISON and KENNETH W. JOHNSON

It is certified that error appears in the above-identified patent and that said Letters Patent are hereby corrected as shown below:

| | |
|---|---|
| Col. 1, line 6 | "wheatstone" should read --Wheatstone-- |
| Col. 1, line 25 | "wheatstone" should read --Wheatstone-- |
| Col. 1, line 63 | "diffused diffuse through" should read --diffused through-- |
| Col. 2, line 7 | "constitutent" should read --constituent-- |

Signed and sealed this 3rd day of June 1975.

(SEAL)
Attest:

RUTH C. MASON
Attesting Officer

C. MARSHALL DANN
Commissioner of Patents
and Trademarks